United States Patent [19]

Frank

[11] 4,104,576
[45] Aug. 1, 1978

[54] EQUIPMENT WITH CONTROLLED REACTANCE

[75] Inventor: Harry Frank, Västerås, Sweden

[73] Assignee: ASEA AB, Västerås, Sweden

[21] Appl. No.: 745,906

[22] Filed: Nov. 29, 1976

[30] Foreign Application Priority Data

Dec. 1, 1975 [SE] Sweden ............................ 7513475

[51] Int. Cl.² .............................................. H02J 3/18
[52] U.S. Cl. ................................... 323/102; 323/105; 323/119; 323/124
[58] Field of Search .................... 323/8, 101, 102, 105, 323/108, 109, 110, 119, 121, 122, 124, 127, 128

[56] References Cited

U.S. PATENT DOCUMENTS

| | | | |
|---|---|---|---|
| 3,955,134 | 5/1976 | Woodford | 323/109 X |
| 3,992,661 | 11/1976 | Kelley | 323/102 |
| 4,028,614 | 6/1977 | Kelley | 323/127 X |

*Primary Examiner*—A. D. Pellinen
*Attorney, Agent, or Firm*—Pollock, Vande Sande & Priddy

[57] ABSTRACT

Apparatus for power factor correction of alternating current networks in a continuous fashion. A first group of reactance devices are each serially connected to the network through a switching device, and a second reactance device is connected in the network through a control device for continuous control of the reactance provided by the second reactance device. A source of control signals responds to a signal determinative of the desired reactive power and controls the switching device for step-wise varying the reactance provided thereby and likewise controlling the control device for continuous control of the reactance contributed by the second reactance device to provide for overall continuous control of reactance as a function of the signal.

7 Claims, 6 Drawing Figures

4,104,576

EQUIPMENT WITH CONTROLLED REACTANCE

BACKGROUND

The present invention relates to equipment for connection to an alternating current network for power factor correction.

It is desirable to achieve equipment in which the reactance can be controlled in a simple and rapid manner. A typical example of a field of use of such a device is power factor correction, i.e., correction of the reactive (usually inductive) power consume by one or more load objects connected to a power supply system, so that the resulting reactive power consumption becomes low and preferably as close to zero as possible.

For this purpose, one technique is to use a number of capacitor banks, each of which can be selectively connected or disconnected from the network depending on the need for correction. It is also known to use a capacitor bank which is permanently connected to the network, together with a number of reactors, each of which can be selectively connected to or disconnected from the network. In this case, for example, the sum of the rated powers of the reactors may be equal to the rated power of the capacitor bank, the reactors being successively disconnected when the need for compensating capacitive reactance increases.

In both these cases the reactance of the equipment can only be varied in discrete steps, and for practical and economical reasons, the number of steps must be relatively low. Since the need for correction as a rule varies continuously and randomly, this means that the correction is usually never exact but that a certain uncorrected reactive power necessarily remains. Since the number of steps must be low, the average residual uncorrected power will be so great that it constitutes a considerable disadvantage in the known equipment mentioned.

It is further known to use a fixed capacitor bank and a reactor in series with a pair of parallel, oppositely poled thyristors, connected to the network. By phase angle control of the thyristors, the current through the reactor can be controlled continuously. If, for example, the rated powers of the reactor and the capacitor bank are equal, the reactance of the equipment can be controlled, in principle, continuously between zero and the reactance of the capacitor bank. However, by the phase angle control, overtones occur in a known manner in the load current of the equipment, and the current overtones cause voltage overtones in the network because of the network impedance. As is clear from the above, the rated power of the reactor is of the same order of magnitude as the maximum need for correction, and this means that current and voltage overtones will be of such magnitude to constitute considerable disadvantage in this type of equipment.

The invention aims to provide a simple and economically advantageous equipment of the kind mentioned in the introduction, the reactance of which can be continuously controlled in a simple manner within a great range and which causes a minimum of current and voltage overtones.

BRIEF DESCRIPTION OF THE DRAWINGS

The invention will be described in greater detail in the following with reference to the accompanying FIGS. 1 through 6.

A DESCRIPTION OF PREFERRED EMBODIMENTS

Figure 1:
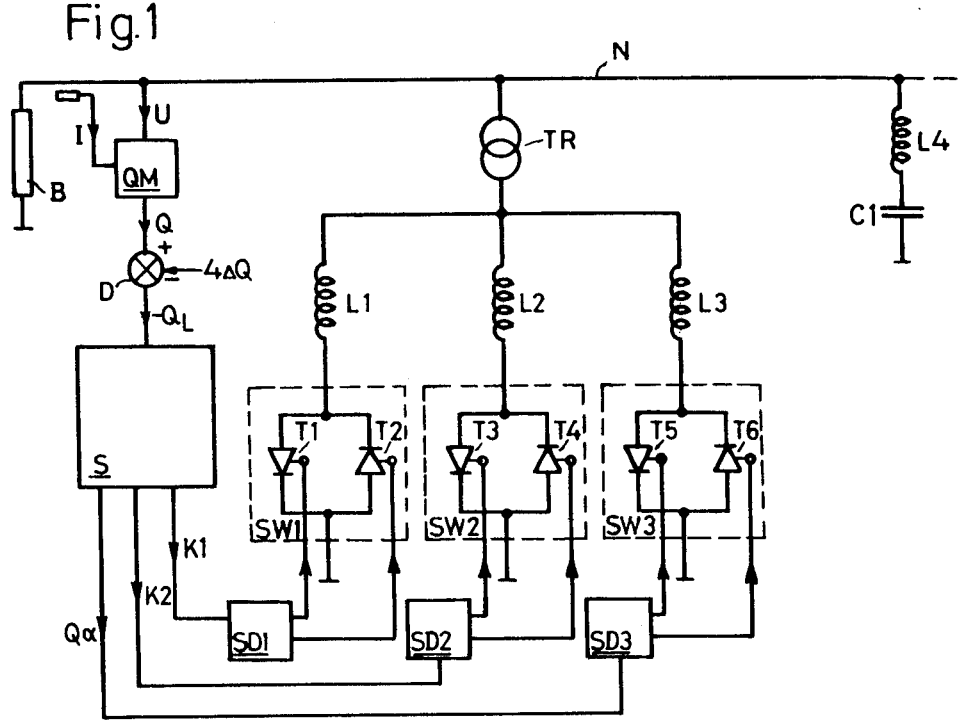
FIG. 1 shows a device with a fixed capacitor bank and two switched and one phase-angle controlled reactor.

FIG. 1 shows an indirect system for power factor correction of an inductively loaded alternating current network N. The fact that the system is indirect means that a fixed capacitor bank is connected to the network. Further, the system has a variable inductive reactance and by controlling this the total reactive power of the system can be varied.

Connected to the network N, symbolically shown, is a load B. It is assumed that the load B consumes inductive power from the network and that it is desirable to compensate for all of this inductive power so that the resulting reactive power taken from the network is zero. The load B may, for example, consist of an electric arc furnace, a converter equipment, or the like, and it is supposed that its inductive power consumption varies more or less at random. A fixed capacitor bank C1 is connected to the network N in series with a reactor L4. The rated power of the capacitor bank is 4 $\Delta Q$. The reactor L4 is suitably dimensioned so that it forms a harmonic filter together with the capacitor bank for the fifth or seventh tone of the line voltage. The rated power of the reactor then becomes so small that its influence on the reactive power of the capacitor bank becomes negligible. The three reactors L1, L2 and L3 are connected to the network N via a transformer TR. Each of the reactors is series-connected to a switch SW1, SW2 and SW3, respectively. The two switches SW1 and SW2 are used for connection or disconnection of the reactors L1 and L2. They may be in the form of conventional circuit breakers or, as shown in the Figure, of parallel oppositely poled thyristors T1–T4. The thyristors are controlled from control devices SD1 and SD2. Each control device may supply a constant control voltage to both of its thyristors and the associated reactor will then be connected to the network. By removing the control voltage from the thyristors, they cease to conduct, and the associated reactor is disconnected from the network. The control devices are controlled in turn from Signals K1 and K2, respectively, which may be either a logical zero or a logical one. When, for example, K1 is zero, SD1 emits no control voltage to T1 and T2, the reactor L1 is therefore disconnected from the network. If K1 is a one, however, SD1 supplies a control voltage to the thyristors which become conducting and connect L1 to the network. The signal K2 controls the connection of L2 into the network by way of SD2. As shown in FIG. 1, the switch SW3 consists of two parallel, oppositely poled thyristors T5 and T6. These receive control signals from a control device SD3, which is controlled by a signal $Q\alpha$. The control device SD3 controls the thyristors with a variable control angle in relation to the line voltage. The control angle can be varied between 90°, at which the thyristors are continuously conducting and full current passes the reactor L3, and 180°, at which the current through the reactor has been reduced to zero. The signal Qα controls the control device SD3 in such a way that the current through the reactor is proportional to Q α. It is presupposed in the following that the proportionality constant is chosen so that the reactive power of the reactor L3 corresponds to the value of the signal Q α. L3 has the rated power ΔQ, so Q α and thus the reactive power of the reactor can be varied between zero and ΔQ. A measurement device $Q_M$ is supplied with the line voltage U and the current I and calculates in a manner known per se the inductive power Q consumed by the load B. In order that full and exact compensation may prevail at each moment, the equipment according to the invention, that is, C1, L1, L2 and L3 shall consume a capacitive reactive power from the network which corresponds to the inductive reactive power Q consumed by the load B. The total reactive power of the equipment is the difference between the reactive power 4 ΔQ of the capacitor bank C1 and the total reactive power $Q_L$ of reactors L1-L3. The following condition thus applies:

$$Q + Q_L = 4 \Delta Q$$

that is, $$Q_L = 4 \Delta Q - Q$$

The signal Q and a fixed signal corresponding to 4 Δ Q (the reactive power of the capacitor bank) are supplied with opposite signs to a summing device D, which forms the signal $Q_L$ (with reversed sign). This signal is supplied to a control circuit S which emits the control signals to the different parts of the equipment; the control circuit S will now be described with regard to FIG. 2.

Figure 3:
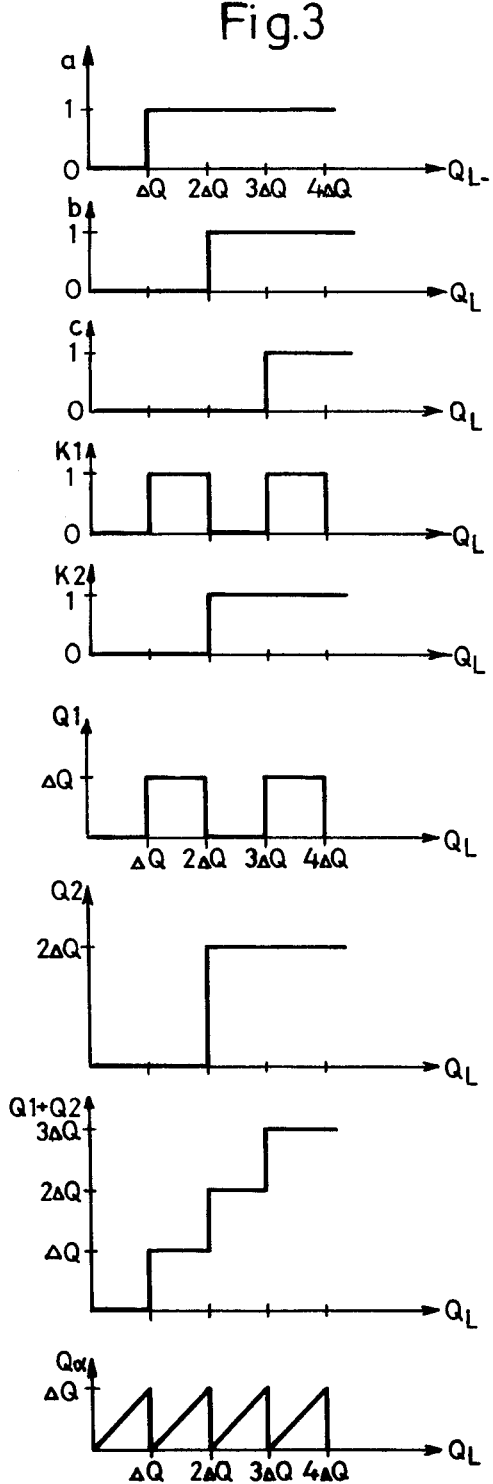
FIG. 3 shows in diagrammatic form how some of the parameters of the equipment vary during operation.

The control circuit S is built up of five operational amplifiers F1-F5 and four AND circuits A1-A4. The amplifier F1 reverses the sign of input signal $-Q_L$ and its amplification is determined by the resistors R1 and R2. Its output signal is supplied to the amplifiers F2, F3 and F4. These amplifiers, together with the associated resistors (R3-R11) provide three comparators, each producing a logic one or zero depending on the input quantity $Q_L$ and the switching level of the comparator. The switching level of each comparator is determined by the fixed voltage which is supplied to its sign-reversing input by way of a potentiometer (P1-P3). These voltages are chosen so that the switching level of F2 lies at $Q_L = \Delta Q$, of F3 at $Q_L = 2 \Delta Q$ and of F4 at $Q_L = 3 \Delta Q$. Each of the output signals a, b and c from the comparators may consist of a logical zero or a logical one. The output signals are shown at the top of FIG. 3 as functions of $Q_L$. Starting from the signals a, b and c, the control signals K1 and K2 for switches SW1 and SW2 are generated with the help of the AND circuits A1-A4. The signals K1 and K2 are shown as functions of $Q_L$ in FIG. 3. In FIG. 3 there are also shown the quantities Q1 and Q2 as functions of $Q_L$. Q1 is the inductive power from the network consumed by the reactor L1 and Q2 the inductive power consumed by the reactor L2. When K1 is a logic one, SW1 is energized and L1 consumes reactive power Δ Q, and when K1 is a logic zero SW1 is disconnected and L1 consumes no reactive power. The signal K2 controls Q2 in a corresponding manner, with the difference that, since the rated power of L2 is 2 Δ Q, Q2 will be either zero or 2 ΔQ. The total reactive power of the reactors L1 and L2, that is Q1 + Q2, is shown as a function of $Q_L$ in FIG. 3.

The amplifier F5 has the input resistors R12-R15 and the feedback resistor R16. The signals a, b and c are supplied to the amplifier by way of resistors R12-R14. The sum of these three signals follows the same stepped curve as Q1 + Q2 in FIG. 3, and by a suitable choice of resistors R12-R14, said sum can be caused to correspond to Q1 + Q2. The amplifier is supplied, via resistor R15, with a signal which corresponds to $-Q_L$. The total input signal to the amplifier thus consists of the difference (with reversed sign) between $Q_L$ and Q1 + Q2. A signal Q α corresponding to this difference is supplied by F5 to the control device SD3. The circuits are formed so that the inductive power consumed by the reactor L3 has the value Q α. Q α will thus at each moment have a value such that the following condition is fulfilled:

$$Q1 + Q2 + Q\alpha = Q_L$$

that is, at each moment a full and exact compensation is obtained of the inductive power consumption of the load B. The rated power of the reactor L3 is Δ Q and will therefore vary between zero and Δ Q in the manner shown at the bottom of FIG. 3.

Figure 4:
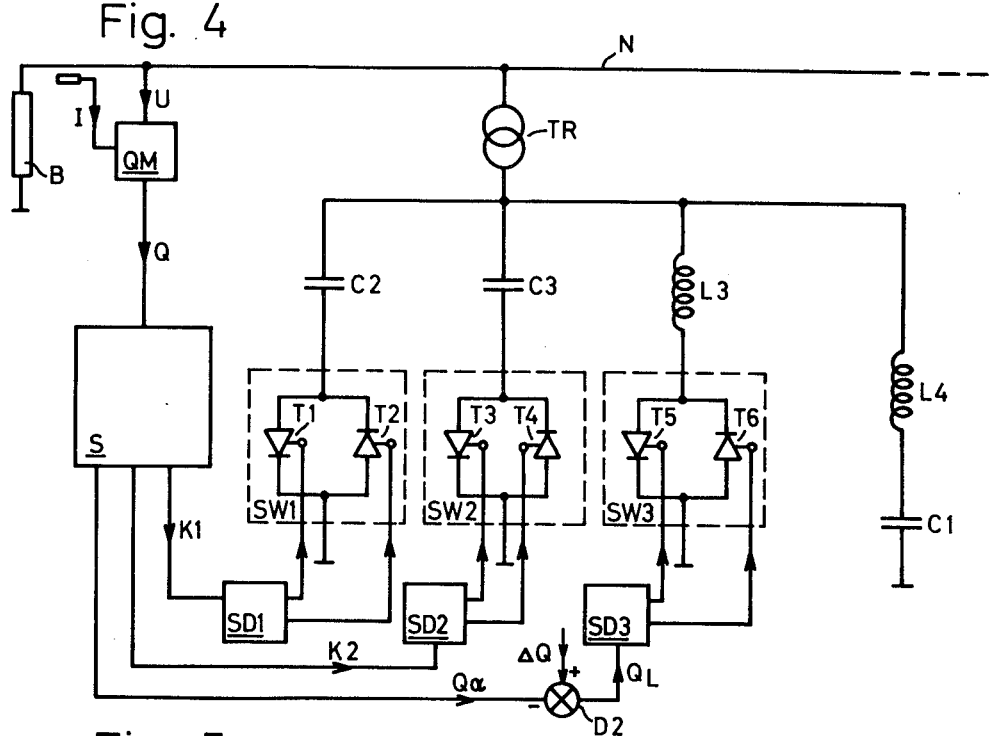
FIG. 4 shows another equipment according to the invention, which has a fixed and two switched capacitor banks and a phase-angle controlled reactor.

FIG. 4 shows an alternative embodiment of the invention. As described above, an inductive load B is connected to the network N. Also connected to network N is a measurement means $Q_M$ which measures the inductive power consumed by the load B. The measurement device forms an output signal Q which directly indicates the capacitive reactive power required to compensate the inductive power of the load B. The capacitor banks C2 and C3 are connected to the network by way of a transformer TR. In series with each capacitor bank is a switch SW1 and SW2, respectively, which consist of parallel, oppositely poled thyristors T1-T4. Connected in parallel with the capacitor banks is the reactor L3 in series with switch SW3 comprising parallel, oppositely poled thyristors T5 and T6. A fixed capacitor bank C1 is connected to the transformer TR in series with a reactor L4. The rated power of C1 is Δ Q, and the reactor L4 is dimensioned so that it forms a harmonic filter for the fifth or seventh tone of the network together with C1, in the manner described above. The rated power of the reactor L3 is also Δ Q and of the capacitor banks C2 and C3, Δ Q and 2 Δ Q, respectively. A control circuit S is supplied with the signal Q and is built up in the same way as the circuit shown in FIG. 2. The same is true of control devices SD1, SD2 and SD3.

The signals K1, K2 and Q α follow (as functions of Q) the same curves as those shown in FIG. 3 (but there as functions of $Q_L$). Q1 and Q2 then indicate the capacitive power of the capacitor banks C2 and C3, respectively, and Q α indicates the residual capacitive power required for achieving full compensation. This residual capacitive power is the capacitive power of C1, namely ΔQ, less the inductive power $Q_L$ of the reactor L3. The latter power shall thus at each moment be $$Q_L = \Delta Q - Q\alpha$$

$Q_L$ is formed by feeding to summer D2 a fixed signal corresponding to Δ Q, and the signal Q α with a sign reversal. The output signal of D2 will then be $Q_L$ which is supplied to the control device SD3 which controls the thyristors T5 and T6 so that the inductive power of the reactor L3 at each moment becomes $Q_L$.

Figure 2:
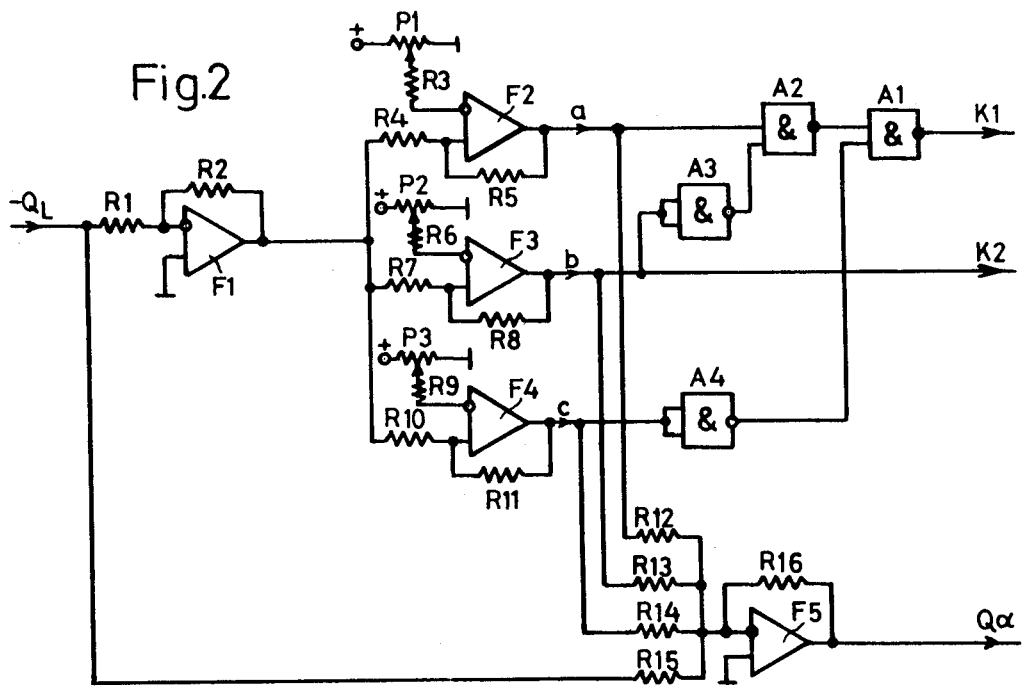
FIG. 2 shows the control circuit for the equipment in FIG. 1.
Figure 5:
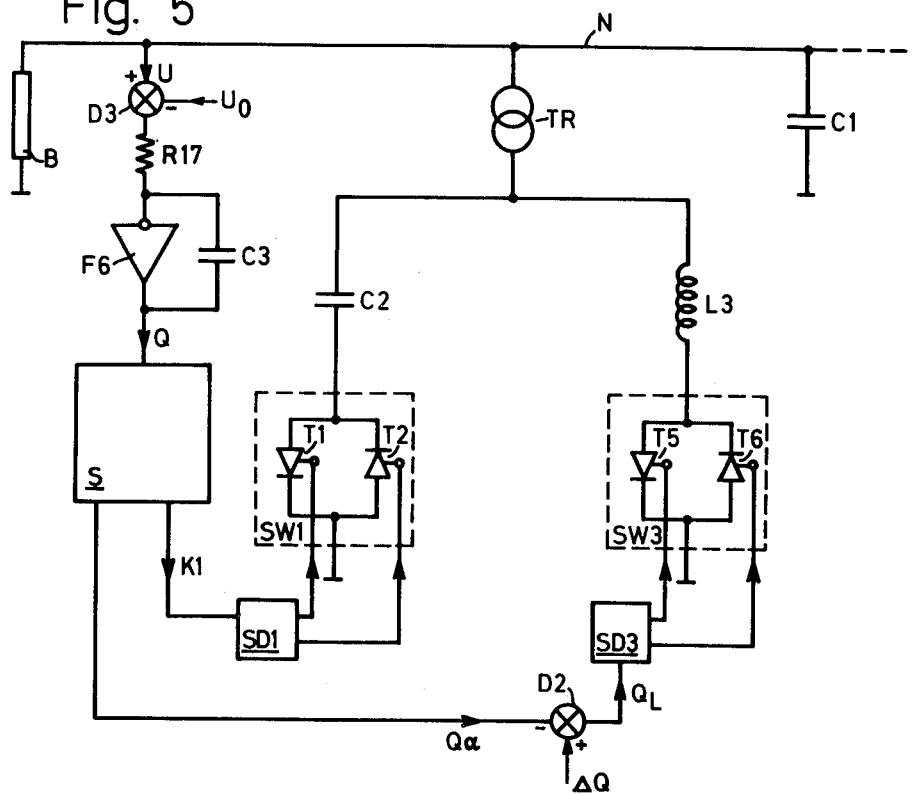
FIG. 5 shows an alternative embodiment of the invention.
Figure 6:
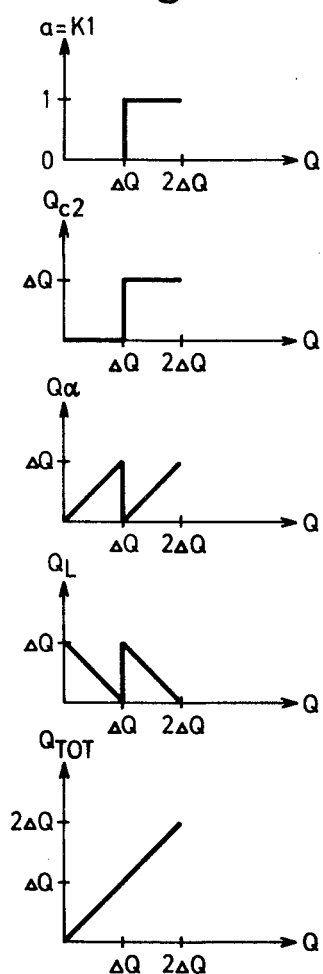
FIG. 6 shows how some of the parameters in this equipment vary during operation.

FIG. 5 shows an alternative equipment according to the invention. It corresponds largely to the equipment shown in FIG. 4. The "first group" of reactance means in this embodiment consists of one single capacitor bank C2 with the rated power $\Delta Q$, which can be connected and disconnected with the help of the semiconductor switch SW1. This includes, as in FIG. 4, the parallel, oppositely poled thyristors T1 and T2 controlled from the control device SD1 in dependence on the signal K1 from the control device S. The capacitor bank C1, with rated power $\Delta Q$, is directly connected to the network N. The "second group" of reactance means consists of the inductor L3, also with rated power $\Delta Q$, controlled with regard to phase angle by way of the control device SD3 and the thyristors T5 and T6 in dependence on the signal $Q_L$. The transformer TR has a network winding for connection to the network N and a second winding, normally for lower voltage, connected to the capacitor bank C2 and the inductor L3. The control device S can be built up in the same way as shown in FIG. 2. The amplifiers F3 and F4 with associated components (P2, P3, R6–R11, R13–R14) are omitted, as well as the four AND gates A1–A4. The output signal K1 of the control device consists of the output signal "a" from amplifier F2. The signals K1 and $Q\,\alpha$ constitute the same functions of the input signal Q to the control device S as $Q_L$ in FIG. 3. As in FIG. 4, the difference between the fixed value $\Delta Q$ and the value $Q\,\alpha$ is formed in the comparison device D2. The difference $Q_L = \Delta Q - Q\,\alpha$ is supplied to the control device SD3, which controls the current of the inductor L3 so that the reactive power consumption of the inductor follows and corresponds to $Q_L$. FIG. 6 shows the signals K1, $Q\,\alpha$ and $Q_L$ as functions of the input signal Q to the control device S. FIG. 6 also shows how the capacitive reactive power $Q_{C2}$ of the capacitor C2, the inductive reactive power $Q_L$ and the total reactive power $Q_{TOT}$ of the equipment vary with the signal Q. $Q_{TOT}$ is obtained from $Q_{TOT} = Q_{C1} + Q_{C2} - Q_L$.

In the equipment of FIGS. 1 and 4 the reactive power consumption of the load is measured and the equipment is controlled so that at each moment it generates an equal reactive power. FIG. 5 shows another embodiment of the control function. The line voltage U is sensed and compared in the comparison device D3 with a reference value $U_0$ for the line voltage. The difference, that is, the deviation of the line voltage from the reference value, is supplied to a regulator with integrating function, which consists of the amplifier F6 with the input resistor R17 and the feed-back capacitor C3. The output signal Q of the regulator is supplied to the control device S which, in a manner described above, controls the total reactive power $Q_{TOT}$ of the equipment so that it corresponds to Q. Alterations in the reactive power $Q_{TOT}$ cause alterations in the line current and thus in the voltage drop in the network. In steady-state condition, $U = U_0$ and Q has a value such that the reactive power and thus the current and the voltage drop in the network result in the load voltage $U_0$. An alteration of the line voltage U, caused e.g., by an alteration in the current consumption of the load B, gives rise to an input signal to the regulator other than zero. The output signal of this regulator will then change with a speed proportional to the input signal until an equilibrium has been reached again, that is, U becomes equal to $U_0$.

As is clear from FIG. 6, the reactive power of the equipment can be controlled from zero to $+ 2 \Delta Q$. The magnitude of the control range is thus $2 \Delta Q$. Since, in the example described $Q_{C2} = Q_{L3} = \Delta Q$, the power flowing through the transformer may vary between $- \Delta Q$ and $+ \Delta Q$. Therefore, the rated power of the transformer does not have to be greater than $\Delta Q$, that is, only half of the control range of the equipment. This is a considerable reduction compared with previously known equipment where the capacitor (C2) was permanently connected. Compared with this type of equipment, the rated power of the inductor is reduced (to half) holding constant the control range. In addition to the immediate gains with regard to economy, etc., which are obtained by this, a reduction to half of the overtones occurring through the phase-angle control of the reactor is achieved.

Since both capacitor C2 and reactor L3 participate in the control, there is further a considerable decrease in the active power losses of the equipment. When the reactive power of C2 + L3 is zero (or almost zero) both C2 and L3 can be kept disconnected (see FIG. 6). The otherwise high power losses in the reactor (because of the current therein) are thus eliminated completely and the losses of the equipment are markedly reduced so as to consist in principle only of the no load losses of the transformer TR.

In equipment with a permanently connected capacitor (C2), a violent current surge is often obtained when connecting the equipment into the network, which may constitute a serious drawback. In a device according to FIG. 5, the thyristors T1–T2 and T5–T6 can be blocked in a simple manner when connecting the equipment, and in this way the current surge during connection is reduced or eliminated.

The capacitor bank C1 in FIG. 5 may, of course, have an arbitrary capacitance, depending on how great a constant capacitive reactive power one wishes to generate. If desired, C1 can be entirely omitted. The reactive power of the equipment can then be controlled between $- \Delta Q$ and $+ \Delta Q$.

It is, of course, not necessary for the rated powers of C2 and L3 to be exactly the same in a device according to FIG. 5. In order to obtain all the advantages mentioned above, however, the rated powers of C2 and L3 should be at least substantially the same.

The capacitor bank C2 in FIG. 5 may, as in FIG. 4, be replaced by two or more capacitor banks, each one with its own semiconductor switch. Similarly, if desired, the inductor L3 can be replaced by several inductors. Each of these may be provided with means for phase-angle control of the current. As an alternative, only one of the inductors can be provided with means for continuous control, the other inductors then being provided with switching means which are controlled so that the total reactance of the inductors can be varied continuously between zero and a maximum value.

The embodiments described above are, of course, only examples of how equipment according to the invention can be developed. The equipment is shown to be single phase in the figures, but, of course, the invention is applicable to three-phase networks, and of course this is the most important field of use of the invention in practice. The transformer TR is not a necessary part of the equipment and may be eliminated, if practical and economical. The fixed capacitor bank C1, which in FIG. 1 is shown connected to the network and in FIG. 4 to the secondary side of the transformer, may be placed at either location in both the types of equipment. A further alternative is to provide the transformer TR with a tertiary winding, to which the capacitor bank is connected. This will make it possible to design the capacitor bank for the most suitable voltage from a practical-economical point of view. If considered appropriate, the capacitor bank may be divided into several parallel-connected parts, each with its own series reactor, which are then formed so that each capacitor with its reactor constitutes an overtone filter for some of the overtones of the network. Especially in the equipment shown in FIG. 4, more efficient utilization of the thyristors can be obtained by providing the transformer TR with a tertiary winding to which the reactor L3 is connected. The voltage levels of the secondary and tertiary windings of the transformer are then chosen so that the voltage and current are fully utilized in all the thyristors of the plant.

What is claimed is:

1. Power factor correcting equipment for connection to an alternating current network including:
    a transformer with two windings, one winding connected to said network,
    switching means,
    first reactance means rated at reactive power $q$ and connected to said other winding including at least one reactance device serially connected to said switching means for rapid connection to and disconnection from said network,
    second reactance means rated substantially at said reactive power $q$ and also connected to said other winding including at least one inductor and a control means for continuous control of the reactance of said at least one inductor, and
    second control means responsive to a signal determinative of necessary reactive power for controlling said switching means, for step-wise varying the reactance provided by said first reactance means, and for controlling said control means for continuous control of the reactance contributed by said second reactance means, to provide for overall continuous control of reactance as a function of said signal.

2. Power factor correcting equipment according to claim 1 in which said first reactance means consists of a capacitor bank.

3. Power factor correcting equipment according to claim 1 in which said switching means comprise a pair of parallel-connected, oppositely poled thyristors.

4. Power factor correcting equipment according to claim 1 in which said at least one reactance device consists of an inductor.

5. Power factor correcting equipment according to claim 1 in which said control means consists of a pair of parallel-connected, oppositely poled thyristors and means for controlling the phase angle of current flowing through said at least one inductor.

6. Power factor correcting equipment of claim 1 in which the reactance of said second reactance means is continuously controlled within a range corresponding to the size of reactance steps of said first reactance means.

7. Power factor correcting equipment of claim 1 in which the reactive power drawn by said first reactance means is opposite in sense to the reactive power drawn by said second reactance means.

* * * * *